INVENTORS
ARNOLD UNGER
ROBERT L. JAMES
BY John B. Froome
ATTORNEY

INVENTORS
ARNOLD UNGER
ROBERT L. JAMES
BY John B. Fresone
ATTORNEY

United States Patent Office 3,038,146
Patented June 5, 1962

3,038,146

INFINITE MEMORY AND NON-DESTRUCTIVE READOUT INTEGRATING CIRCUIT

Arnold Unger, Hasbrouck Heights, and Robert L. James, Bloomfield, N.J., assignors to The Bendix Corporation, a corporation of Delaware Filed May 28, 1958, Ser. No. 738,328
9 Claims. (Cl. 340—174)

Figure 1:
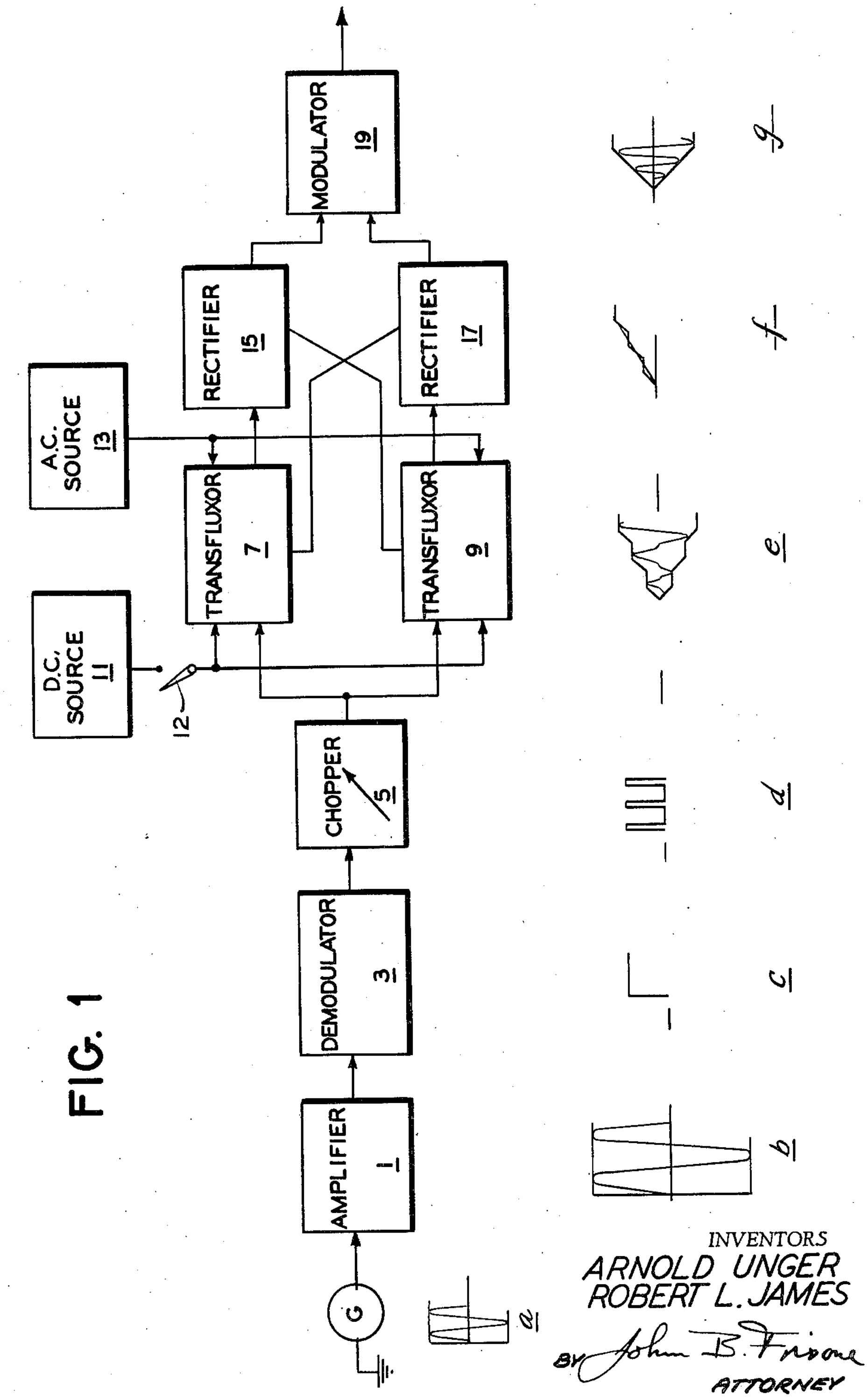

This invention relates to integrators in which information may be stored and readout at any time.

A device capable of performing these functions is essential for the proper operation of autopilots employed on mobile craft. Electro-mechanical devices were used for this purpose heretofore but these devices were too heavy and bulky for satisfactory use in autopilots.

One object of this invention is to provide a reliable electric circuit which will provide an output that corresponds to a time integral of a signal applied thereto and which will store the output for an indefinite period after the removal of the signal and provide non-destructive readout.

Another object of the invention is to provide an integrating circuit with infinite memory and non-destructive readout which circuit is compact, low in weight, inexpensive to manufacture and has no functionally moving parts.

The invention contemplates a pair of blocked transfluxors adapted to be connected to a source of direct current signal voltage to unblock one of the transfluxors, depending on the polarity of the signal, by an amount corresponding to the amplitude and the duration of the signal, an output winding on each transfluxor for supplying an output the amplitude of which corresponds to the amount of unblocking by the signal voltage and means on each transfluxor connected to the output winding of the other transfluxor to maintain the blocked transfluxor in blocked condition until such time as the unblocked transfluxor output goes to zero.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 2:
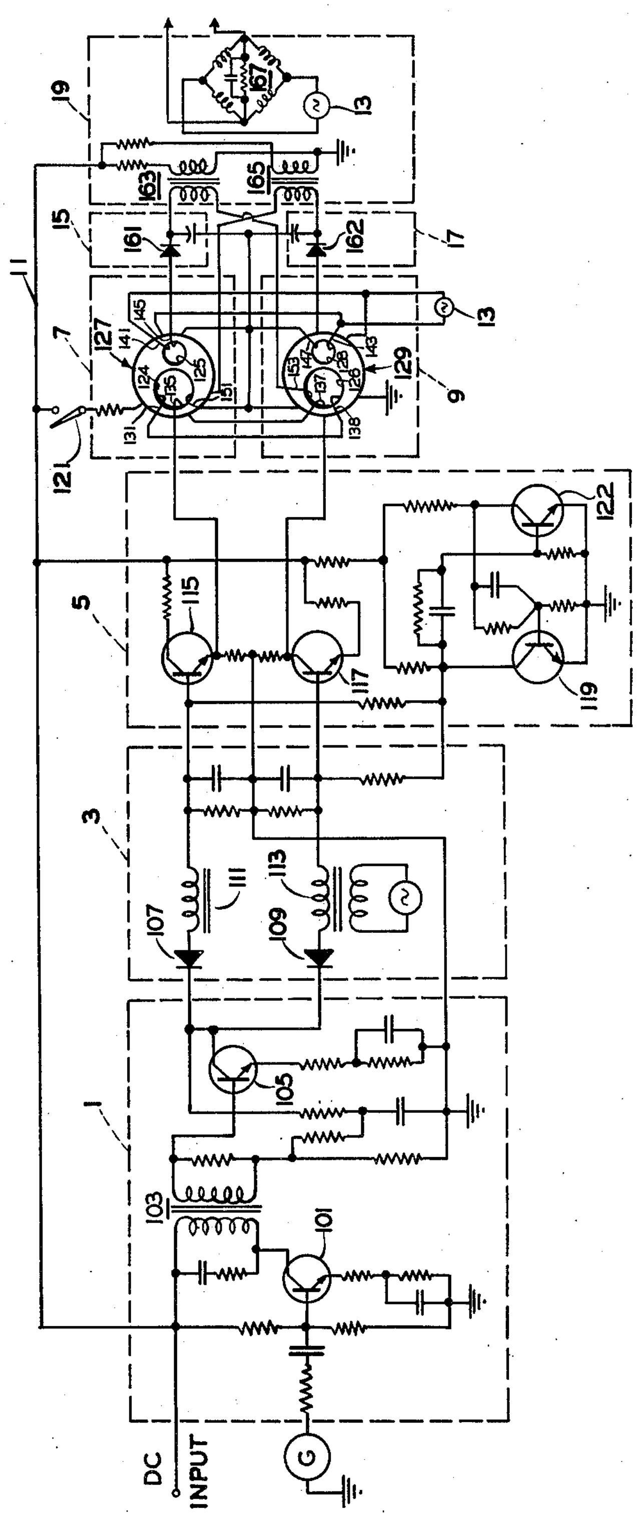

In the drawings:

FIGURE 1 is a block diagram of a novel integrator constructed according to the invention and shows the waveforms of the signal as it passes through the integrator; and FIGURE 2 is a schematic diagram of the circuit shown in block form in FIGURE 1.

In the novel integrator shown in FIGURE 1, modulated carrier signals *a* from a generator G are applied to an amplifier 1. The amplified signals *b* from amplifier 1 are demodulated by a phase sensitive demodulator 3 which provides a demodulated output *c* whose polarity corresponds to the phase of signal *a*. The demodulated signal is applied to a chopper 5 having an adjustable pulse width and repetition rate to provide a chopped direct current signal *d*.

A pair of transfluxors 7 and 9 are energized by an alternating current source 13 and are initially oppositely blocked by a direct current pulse from source 11 by closing switch 12. The chopped direct current signal pulses *d* are applied to transfluxors 7 and 9 and unblock one of the transfluxors, as determined by the instantaneous polarity of the signal pulses, by inducing a flux in the transfluxor which opposes the blocking flux. The amount of unblocking is determined by the amplitude of the pulse, the pulse repetition frequency, and the duration of the pulse. The magnitude of the output *e* of the unblocked transfluxor corresponds to the amount of unblocking.

Rectifiers 15 and 17 are connected to transfluxors 7 and 9, respectively, and rectify the output *e* as shown by curve *f*. A portion of the rectified output of transfluxor 7 is applied to transfluxor 9 and a portion of the rectified output of transfluxor 9 is applied to transfluxor 7 so that even when the polarity of the chopped direct current signal *d* reverses, the blocked transfluxor continues to be blocked until the unblocked transfluxor becomes blocked and its output goes to zero. With this arrangement only one transfluxor is unblocked at any time to provide an output.

Rectifiers 15 and 17 are connected to modulator 19 which converts the output *f* of transfluxors 7 and 9 to an alternating voltage *g* corresponding to a time integral of the modulated carrier signal *a* from generator G. Rectifiers 15 and 17 cooperate with modulator 19 so that the modulator provides an output substantially free of harmonic frequencies.

The transfluxor performs the integration because of the long time constant of the transfluxor input circuit relative to the duration of the signal pulse applied thereto. Since the integration rate depends in part on the pulse duration and the repetition rate of signals *d* applied to the transfluxors, the pulse width and repetition rate of chopper 5 are made adjustable so that the integration rate of the circuit may be varied to suit different operating conditions.

The waveforms *b* to *g* correspond to a signal *a* of one phase. When signals *a* of opposite phase are applied to the integrator, the voltages *c* and *d* from demodulator 3 and chopper 5 are of opposite polarity and output *f* is of opposite phase.

In FIGURE 2, modulated carrier signal *a* from a signal generator G is applied to a first transistor stage 101 of amplifier 1, coupled by a transformer 103 to a second transistor stage 105. The amplified signal is applied through rectifiers 107 and 109 and reactor elements 111 and 113 of phase sensitive demodulator 3 to a pair of push-pull transistors 115 and 117 of chopper 5. A pair of transistors 119 and 122 provide gating pulses of adjustable pulse width and repetition rate to bias transistors 115 and 117. The fixed negative bias on the bases of transistors 115 and 117 due to the quiescent voltages at the demodulator output is opposed by positive pulses from transistors 119 and 122 and the chopper generates no output until a differential signal from the demodulator is applied to the input of the chopper. The signals from transistors 115 and 117 are applied to windings 135 and 137 of cores 127 and 129 of transfluxors 7 and 9, respectively.

Transfluxor cores 127 and 129 each have formed therein two openings 124, 125 and 126, 128, respectively. A winding 131 on core 127 and a winding 133 on core 129 are connected together in series with the direct current source 11 through a switch 121. Windings 131 and 133 are wound on their respective cores so as to produce blocking fluxes in the respective cores. The number of turns in windings 131 and 133 and the currents supplied by source 11 when switch 121 is closed being sufficient to completely saturate and thus block cores 127 and 129. Once cores 127 and 129 are saturated, switch 121 is opened.

A control winding 135 and a control winding 137 on cores 127 and 129, respectively, are connected together in series to the direct current signal from chopper 5 and are arranged on their respective cores so that negative pulses from chopper 5 will unblock one core while positive pulses will unblock the other core.

A primary or excitation winding 141 and a primary or excitation winding 143 on cores 127 and 129, respectively, are connected in parallel with alternating current source 13 and are arranged on their respective cores to produce outputs 180° out-of-phase when the core is unblocked. Secondary or output windings 145 and 147 on cores 127 and 129, respectively, each have one end connected together and their opposite ends connected to diodes 161 and 162 of rectifiers 15 and 17, respectively.

When cores 127 and 129 are in a blocked condition and a signal is applied to control windings 135 and 137, depending upon the polarity, one of the cores will become unblocked and a voltage is induced in either output winding 145 or 147 by the voltage across winding 141 or 143, depending upon which core is unblocked. Should the signal pulses continue in the same sense, the induced voltage across output winding 145 or 147, depending on which core is unblocked, continues to increase and corresponds to a time integral of the input signal at control windings 135 or 137. This increase continues until the unblocked core becomes entirely unblocked or until the polarity of the input signal reverses. In this particular application the cores are designed so that complete unblocking will not occur during normal operation of the circuit. When the instantaneous polarity of the direct current signal from chopper 5 reverses, the core supplying an output via windings 45 or 47 becomes more blocked. If the reverse polarity signal persists, the output signal persists until such time as the core becomes blocked. In order to prevent the other core from developing an output upon a reversal of signal polarity, a portion of the rectified output from the unblocked core is applied to the other core via a pair of windings 151 and 153 wound on cores 127 and 129, respectively, to induce a flux in the other core which is in the same direction as the blocking flux and of sufficient magnitude to maintain that core blocked until the output of the originally unblocked core is reduced to zero. Thereafter the cores will respond as in the case when a signal is first introduced. Should it be necessary or desirable to remove the intelligence from the circuit, switch 121 may be closed, to block both cores. Once the cores are blocked and switch 121 is opened, the circuit is again ready to perform the integration, memory and non-destructive readout function.

The rectified signal from diodes 161 or 162 is applied to reactor elements 163 or 165, respectively, of modulator 119, depending upon which transfluxor has an output. A bridge 167 energized by alternating current source 13 provides a modulated output corresponding to the direct current signal applied to reactor elements 163 or 165. The phase of the modulated signal carrier will be determined by the particular transfluxor which is energizing modulator 19.

The circuit disclosed provides an integrating device without moving parts capable of indefinite memory and non-destructive readout which is easily manufactured, compact and low in weight.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. An integrating circuit having memory and non-destructive readout comprising a pair of blocked transfluxors each having two inputs, a source of a alternating current connected to one of the inputs of each transfluxor for energizing the transfluxors and a source of signal voltage connected to the other input of each transfluxor, the source of signal voltage and associated transfluxor inputs each comprising a circuit with a long time constant for unblocking one of the transfluxors, depending on the instantaneous polarity of the signal, by an amount corresponding to the amplitude and duration of the signal to provide an output the amplitude of which corresponds to the amount of unblocking, and means on each transfluxor connected to the output of the other transfluxor to maintain the blocked transfluxor in the blocked condition when the other transfluxor has an output.

2. A signal integrating circuit having memory and non-destructive readout comprising a pair of transfluxor cores, means for blocking said cores, windings on said cores adapted to be connected to a source of signal voltage in a circuit with a long time constant to unblock one of the cores, as determined by the instantaneous polarity of the signal, by an amount corresponding to the amplitude and duration of the signal, a primary winding on each core adapted to be energized by an alternating current source, a secondary winding on each core having an alternating current voltage induced therein when the core is unblocked corresponding to a time integral of the signal, and a feedback winding on each core connected to the secondary winding of the other core to maintain the blocked core in the blocked condition when the other core has an output.

3. A signal integrating circuit having memory and non-destructive readout comprising first and second transfluxor cores, means for blocking said cores, windings on said cores adapted to be connected to a source of signal voltage in a circuit with a long time constant, said windings being arranged to unblock by an amount corresponding to the amplitude and duration of the signal one of said cores for signals having one polarity and the other core for signals having an opposite polarity, a primary winding on each core adapted to be energized by an alternating current source, a secondary winding on each core energized by flux change caused by the current in said primary winding when the associated core becomes unblocked and providing an output which corresponds to a time integral of the signal, and means connecting the secondary windings of the first and second cores with the second and first cores, respectively, to maintain one core in a blocked condition when the other core is unblocked.

4. The circuit described in claim 3 wherein the means connecting the secondary windings of the first and second cores with the second and first cores, respectively, includes rectifying means.

5. The circuit described in claim 4 wherein said means also includes a winding on each core connected to the rectifying means and arranged to maintain that core in its blocked condition.

6. A signal integrating circuit having memory and non-destructive readout comprising a phase sensitive demodulator adapted to be connected to a source of modulated carrier signal for supplying a corresponding direct current signal having a polarity depending on the phase of the applied signal carrier, a chopper connected to the demodulator for chopping the direct current signal and supplying pulses having a predetermined width and repetition rate, a pair of blocked transfluxors connected to the chopper in a circuit having a long time constant relative to the duration of the pulses for unblocking one of said transfluxors depending on the instantaneous polarity of the signal by an amount corresponding to the amplitude and duration of the chopper pulses, means connected to said transfluxors for providing an alternating current output the amplitude of which corresponds to the degree of unblocking of the unblocked transfluxor, rectifying means connected to the alternating current output, modulating means connected to the rectifying means for supplying an alternating current signal substantially free of harmonics and of a phase depending on which transfluxor is unblocked, and means on each transfluxor connected to the rectifying means of the other transfluxor to maintain the blocked transfluxor in the blocked condition when the other transfluxor is unblocked.

7. The circuit described in claim 6 wherein the means for providing the alternating current output includes a primary winding adapted to be energized by an alternating current source and a secondary winding energized by the current in said primary winding when the transfluxor becomes unblocked.

8. A signal integrating circuit having memory and nondestructive readout comprising a phase sensitive demodulator adapted to be connected to a source of modulated carrier signals for supplying a corresponding direct current signal having a polarity depending on the phase of the applied signal carrier, a chopper connected to the demodulator for chopping the direct current signal and supplying pulses having a predetermined width and repetition rate, first and second transfluxor cores, means for blocking said cores, input windings on said cores connected to the chopper in a circuit having a long time constant relative to the duration of the pulses to unblock one of the cores for signals having one polarity and to unblock the other core for signals having an opposite polarity, by an amount corresponding to the amplitude and duration of the chopper pulses, a primary winding on each core adapted to be energized by an alternating current source, a secondary winding energized by flux change caused by the current in the primary winding when the core becomes unblocked and providing a signal which corresponds to a time integral of the modulated carrier signal envelope, rectifying means connected to the secondary windings, modulating means connected to the rectifying means for supplying an alternating current signal having one phase or another depending on which transfluxor core is unblocked, the alternating current signal being substantially free of harmonics and corresponding to the voltage across the secondary windings, and means connecting a portion of the rectified voltage across the secondary windings of the first and second cores to the second and first cores, respectively, to maintain one core in a blocked condition when the other core is unblocked.

9. The circuit described in claim 8 wherein said last-mentioned means includes a winding on each core arranged to maintain that core in its blocked condition when energized.

References Cited in the file of this patent

UNITED STATES PATENTS

| | | |
|---|---|---|
| 2,802,202 | Lanning | Aug. 6, 1957 |
| 2,818,555 | Lo | Dec. 31, 1957 |
| 2,846,667 | Goodell et al. | Aug. 5, 1958 |
| 2,934,750 | Schaefer | Apr. 26, 1960 |

OTHER REFERENCES

"The Transfluxor," Rajchman and Lo, Proceedings of the IRE, March 1956, pp. 321–332.